United States Patent
Zou

(10) Patent No.: US 8,787,912 B2
(45) Date of Patent: Jul. 22, 2014

(54) METHOD AND APPARATUS FOR COORDINATION OF HANDOFF AMONG MMSS AND RAT PRIORITIES

(75) Inventor: Jialin Zou, Randolph, NJ (US)

(73) Assignee: Alcatel Lucent, Boulogne Billancourt (FR)

(*) Notice: Subject to any disclaimer, the term of this patent is extended or adjusted under 35 U.S.C. 154(b) by 342 days.

(21) Appl. No.: 12/858,898

(22) Filed: Aug. 18, 2010

(65) Prior Publication Data

US 2011/0201338 A1 Aug. 18, 2011

Related U.S. Application Data

(60) Provisional application No. 61/274,529, filed on Aug. 18, 2009.

(51) Int. Cl.
*H04W 36/00* (2009.01)
(52) U.S. Cl.
USPC ......... 455/436; 455/422.1; 455/442; 370/331
(58) Field of Classification Search
USPC ............... 455/436, 422.1, 442–446; 370/331
See application file for complete search history.

(56) References Cited

U.S. PATENT DOCUMENTS

| | | | | |
|---|---|---|---|---|
| 7,096,015 B2* | 8/2006 | Bridges et al. | ............ | 455/432.1 |
| 2004/0068571 A1* | 4/2004 | Ahmavaara | .................. | 709/228 |
| 2009/0270103 A1* | 10/2009 | Pani et al. | ..................... | 455/436 |

* cited by examiner

*Primary Examiner* — Chuong A Ngo
(74) *Attorney, Agent, or Firm* — Ryan, Mason & Lewis, LLP

(57) ABSTRACT

A method is provided whereby wireless system operators broadcast each other's carriers in an inter-RAT neighbor list according to protocols that minimize conflicts with carrier-selection algorithms provisioned in served mobile terminals. According to the method of the invention, Access Networks (ANs) broadcast neighbor lists for their own carriers and carriers of different operators serving the same geographical area, the neighbor list being used for inter RAT reselection. The carrier-selection priorities broadcast in the neighbor list are established to be consistent with the priority policy respecting home network and non-home networks as provisioned in the mobiles by their operator. In case of conflict, the cross-RAT priority broadcast by the AN shall take precedence over the cross-RAT priority provisioned in the mobiles. A network ID, such as PLMN_ID, may be broadcast for each carrier in the neighbor list to support reselection precedence followed by the mobile terminal between home network carriers and the carriers of a non-home network.

20 Claims, 4 Drawing Sheets

Operator A's Roaming Policy

| Priority | Network | System (RAT) |
|---|---|---|
| 4 | Operator A (MNC =1) | LTE |
| 3 | Operator A (MNC =1) | HRPD |
| 2 | Operator B (MNC =2) | LTE |
| 1 | Operator B (MNC =2) | HRPD |

Operator A's Other RAT Neighbor List

| Priority | Network | System (RAT) |
|---|---|---|
| 6 | Operator A (MNC =1) | LTE Carrier 1 |
| 5 | Operator A (MNC =1) | HRPD Carrier 1 |
| 4 | Operator A (MNC =1) | HRPD Carrier 2 |
| 3 | Operator A (MNC =1) | LTE Carrier 2 |
| 1 | Operator B (MNC =2) | LTE Carriers |
| 0 | Operator B (MNC =2) | HRPD Carriers |

*FIG. 2*

Operator B's Other RAT Neighbor List

| Priority | Network | System (RAT) |
|---|---|---|
| 6 | Operator B (MNC=2) | LTE Carrier 1 |
| 5 | Operator B (MNC=2) | HRPD Carrier 1 |
| 4 | Operator B (MNC=2) | LTE Carrier 2 |
| 3 | Operator B (MNC=2) | HRPD Carrier 2 |
| 1 | Operator A (MNC=1) | LTE Carriers |
| 0 | Operator A (MNC=1) | HRPD Carriers |

Operator B's Roaming Policy

| Priority | Network | System (RAT) |
|---|---|---|
| 4 | Operator B (MNC=2) | LTE |
| 3 | Operator B (MNC=2) | HRPD |
| 2 | Operator A (MNC=1) | LTE |
| 1 | Operator A (MNC=1) | HRPD |

*FIG. 3*

METHOD AND APPARATUS FOR COORDINATION OF HANDOFF AMONG MMSS AND RAT PRIORITIES

RELATED APPLICATIONS

This application claims priority pursuant to 35 U.S.C. Sec 119(e) to U.S. Provisional Application No. 61/274,529, filed Aug. 18, 2009, entitled "METHOD FOR COORDINATION OF MMSS WITH CROSS RAT RESELECTION," the subject matter thereof being fully incorporated herein by reference.

FIELD OF THE INVENTION

The present invention generally relates to handoff procedure in a wireless communications system.

BACKGROUND OF THE INVENTION

In wireless communications systems of the art, a variety of transmission protocols have been developed for providing airlink service to users. Exemplary network services based on such transmission protocols include High Rate Packet Data (HRPD), Universal Mobile Telecommunications System (UMTS) and Long Term Evolution (LTE)—sometimes referred to in terms of its air interface Evolved UMTS Terrestrial Radio Access Network (E-UTRAN). Each of these network services is defined in terms of a particular Radio Access Technology (RAT), and, in general, the RAT defining each different transmission protocol requires a unique RF configuration for transmission and reception of communications based on a given RAT. A multi-mode user terminal having RF capabilities compatible with two or more RATs can switch to an available RAT that is most suitable at the relevant time. Given availability of such multi-mode terminals, an operator can also do load-sharing between different RAT carriers provided in its network, so as to improve network usage and performance.

As implied by the prior paragraph, multi-mode terminals are mobile terminals that have the capability to access two or more RAT networks. In the circumstance of such a multi-mode terminal having simultaneous available access to two different RAT networks, or the mobile terminal roaming from a carrier of one RAT type toward another carrier of another RAT type—e.g., from an LTE network to an HRPD network, system algorithms, generally called Multi-Mode System Selection (MMSS), provide the mobile terminal with a method for finding a carrier suited to the services subscribed to by the mobile terminal. Specifically, MMSS enables a mobile terminal to select an authorized or preferred system (and/or a carrier in that system) when the mobile powers up or moves out of the current serving system coverage, such as roaming to another system of a different operator.

With MMSS, a system operator will provision in the mobile a list of potentially available carriers with associated access priorities (e.g., a Preferred Roaming List (PRL) in CDMA/HRPD systems) for the mobile terminals which are subscribed to the operator. At the same time, however, mobiles engaged in idle reselection (or idle handoff (HO)) among the carriers of different RATs may experience different carrier selection criteria, such as prioritization among neighbor-list carriers broadcast by an access network (AN). Note that the neighboring carriers may be from different operators with different Public Land Mobile Network IDs (PLMN_IDs).

When these two mechanisms (MMSS and idle reselection) are both implicated for a given mobile carrier-selection event, the priorities specified in each mechanism may conflict with one another. This is likely to cause the affected mobile terminal to experience ping-ponging between the carriers of different RATs and different operators.

In addition, when cross operator roaming is triggered, a mobile terminal will often expend a large amount of power in search of a roaming handoff, and a large delay will be experienced by a mobile terminal to complete the handoff.

SUMMARY OF INVENTION

A method is provided whereby wireless system operators broadcast each other's carriers in an inter-RAT neighbor list according to protocols that minimize conflicts with carrier-selection algorithms provisioned in served mobile terminals. According to the method of the invention, Access Networks (ANs) broadcast neighbor lists for their own carriers and carriers of different operators serving the same geographical area, the neighbor list being used for inter RAT reselection. The carrier-selection priorities broadcast in the neighbor list are established to be consistent with the priority policy respecting home network and non-home networks as provisioned in the mobiles by their operator. Further, in case of conflict, the cross-RAT priority broadcast by the AN shall take precedence over the cross-RAT priority provisioned in the mobiles. According to an embodiment of the invention, a network ID, such as PLMN_ID, broadcast by the AN for each carrier in the neighbor list, is used to support reselection precedence followed by the mobile terminal between home network carriers and the carriers of a non-home network. In a further invention embodiment, the ANs will broadcast thresholds which are used to trigger reselection to other non-home network carriers.

BRIEF DESCRIPTION OF THE FIGURES

The teachings of the present invention can be readily understood by considering the following detailed description in conjunction with the accompanying drawings, in which:

FIG. 2 illustrates RAT neighbor list prioritization established according to the method of the invention for a first network operator.

FIG. 3 illustrates RAT neighbor list prioritization established according to the method of the invention for a second network operator.

DETAILED DESCRIPTION

Figure 1:
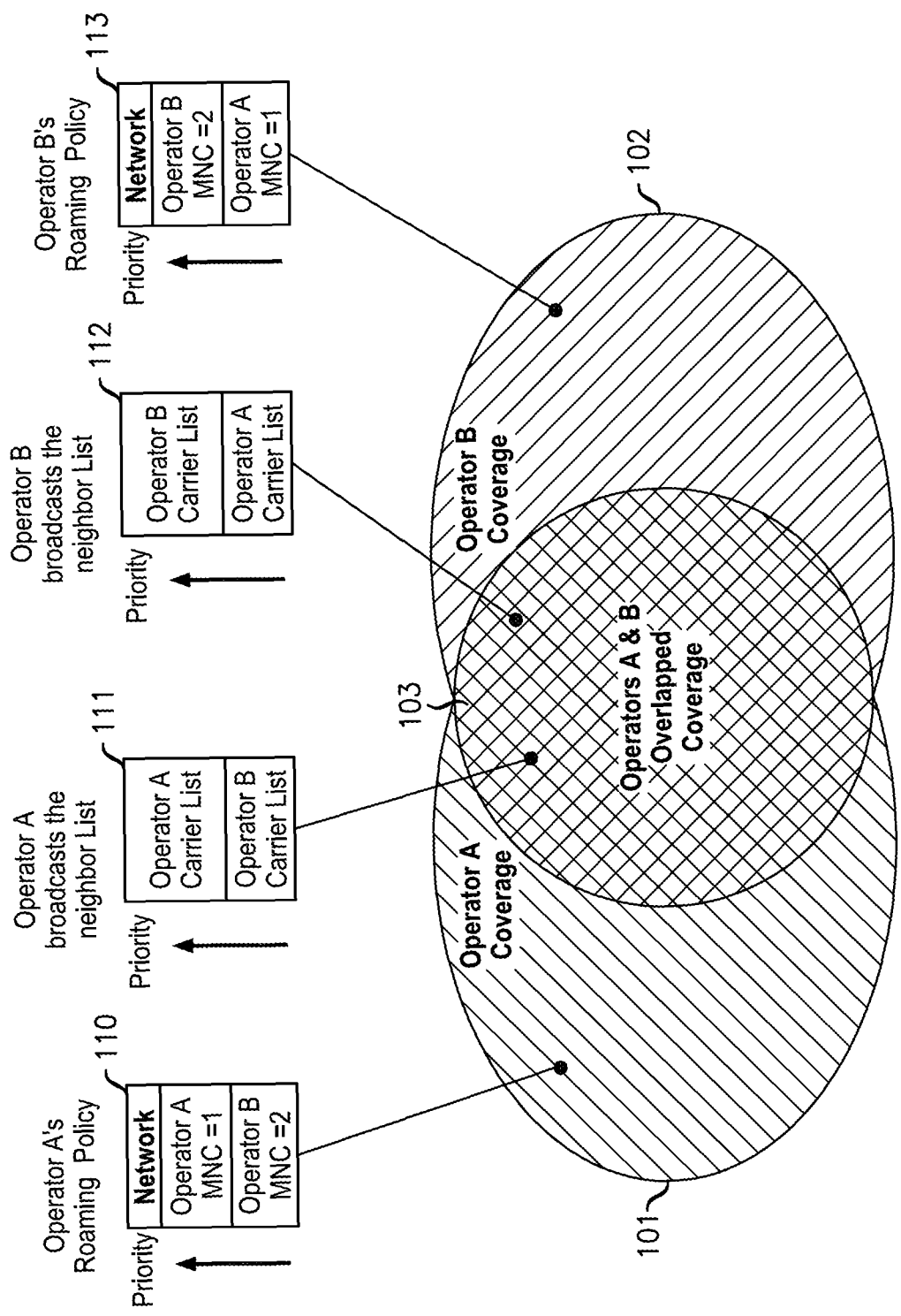
FIG. 1 provides a schematic depiction of the methodology of the invention.

In the following description, for purposes of explanation and not limitation, specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of carrier selection criteria for mobiles operated in an RF environment where access to two or more RAT-type carriers is available. Illustratively, the invention is generally described in terms of reselection by the mobile between HRPD RAT-type carriers and LTE RAT-type carriers. It should be clear, however, that the choice of these two RAT types is simply for convenience of illustration, and that the invention will be applicable to mobile reselection among any RAT-type carriers. Accordingly, the use the illustrative case of HRPD and LTE RAT-type carriers in the description following is solely for purposes of illustrating the invention principles, and is not in any way intended to limit the scope of the invention.

In contemporary wireless networks, a system operator likely provides a plurality of service options (e.g. 2G, 3G and 4G services) for users in a given network, many, if not most of such alternative services involving different RAT types. For various reasons, notably cost and perceived competitive advantage, the system operators generally follow a policy of incenting their subscribing users to connect to the wireless network via carriers provided by that operator as a preferred course. Thus the lists of available carriers provisioned in subscribing mobile terminals (e.g. CDMA/HRPD PRL) will normally provide highest priority for carriers of the "home" operator to which the terminal is subscribed. On the other hand, prioritization of carriers in a neighbor list broadcast by the Access Network (AN) is generally ranked according to RAT preference (e.g., LTE carriers are generally given priority over HRPD carriers) without regard to the identity of the network operator providing a given listed carrier.

The absence of a consistent prioritization rule for carrier reselection between the mobile-centric priority listing and the neighbor list broadcast by the AN can lead to conflict. Thus, given, for example, a neighbor list broadcast by the AN where the highest priority carrier is for an operator other than the home network operator for the receiving mobile terminal, the mobile terminal may reselect to a non-authorized network. However, because such reselection to the non-authorized network will conflict with the mobile-centric priority list favoring carriers of the home network operator over other carriers, the mobile terminal may reselect back to a home network carrier, and then continue to ping-pong between the two carriers due to the conflicting prioritization rules.

Consider the following illustrative case. In a particular coverage area, the home network of a given mobile terminal only has good HRPD coverage, while the neighbor list broadcast by the AN shows neighboring LTE carrier(s) as having higher priority than the home network HRPD carrier(s). The mobile terminal, which is initially camping on the HRPD system of its home network may reselect to an LTE carrier of higher priority even though the LTE carrier belongs to a roaming partner of the home network. After the mobile terminal camps onto the roaming partner's LTE carrier, its home network search function is started. Assume, for purpose of the example, that the MMSS priority order for the mobile is: 1. Home LTE, 2. Home HRPD, 3. Partner LTE, 4. Partner HRPD. The MMSS algorithm causes the mobile to select the HRPD carrier of the home network again, with the result that the mobile will be in a loop of repeatedly ping-ponging between the roaming LTE carrier of the broadcast neighbor list and the home HRPD carrier dictated by the MMSS priority.

The fundamental issue of priority conflicts between MMSS (or, generally, terminal-centric priority determination) and AN-directed reselection is a function of cross operator/RAT roaming via reselection being allowed—i.e., broadcast by a home network of other neighboring operator's carriers in its neighbor list. Stated simply, when a neighboring other operator's carrier(s) are broadcast in the home network operator's neighbor list, the home network operator's roaming policy is not taken into consideration—i.e. the AN's reselection priority is only based on preference among the available RATs of the carriers, without consideration of carrier identity associated with the various RAT carriers.

A simple solution to resolve the reselection issues caused by mixing reselection with MMSS is a restriction on an operator's broadcasting other operator's carriers in the neighbor list with its own carriers. Such an approach would block cross operator roaming through reselection and make reselection and MMSS independent. In this case, the cross system reselection within an operator's coverage would only be based on the AN's direction. Roaming from the home network to other networks will be performed only by MMSS and will only be triggered by the coverage/service outage of all the RATs of the current home network. When coverage again becomes available in the home network, the MMSS may bring a mobile terminal back from other network to the home network based on the MMSS priority listing. While this basically conventional roaming approach is simple to implement, it will introduce more delay and mobile power consumption.

The inventors have developed an alternative approach, described below, as a preferred embodiment of the invention. The invention embodiment will be described in conjunction with FIG. 1 which depicts coverage areas for two neighboring operator networks, Operator A, which can be assumed for purpose of illustration to be the home network operator, and Operator B. The coverage area for Operator A's network is shown within a perimeter designated by forward hatching, and indicated by reference number 101. The coverage area for Operator B's network is shown within a perimeter designated by reverse hatching, and indicated by reference number 102. An overlap area where coverages of Operator A's network and of Operator B's network are overlapped is designated by cross-hatching, and indicated by reference number 103. As should be apparent, the region within which either Operator A or Operator B might include the other operators carriers in its broadcast neighbor list will generally be within the overlap area, 103.

According to the invention embodiment, an operator, illustratively Operator A, broadcasts a neighboring other operator's carriers in its neighbor list according to the follow principles:

In the neighbor list, the other operator's carriers should always be assigned a lower priority than the priorities of all the carriers of the home operator A, as illustrated by the box 111 in FIG. 1, designated as Operator A's neighbor list.

The mobile terminal is only permitted to reselect a non-home network operator's carriers when the links of all the RATs (LTE & HRPD) of the home network operator (e.g., Operator A) cannot support the service.

Correspondingly, the thresholds for the link measurement for different RATs may be broadcast for the mobiles to determine whether all the radio frequency channels of all the RATs of the home network cannot meet the quality requirement.

The priority specified and posted by the AN shall take precedence over the priority specified in MMSS.

Preferably, the priorities assigned by the AN and transmitted with dedicated signaling should take precedence over the neighbor-list priorities broadcast by the AN.

In a further embodiment, the PLMN-ID of each carrier broadcasted by the AN (depicted as "MNC" in FIG. 1) is used by the mobiles to identify different operator's carriers in support of reselection precedence between home network carriers and the carriers of a non-home network.

Only when the AN does not specify any priority for reselection, a mobile terminal may perform the reselection based on MMSS rules or other rules.

As illustrated in FIG. 1, a guiding principle of the invention methodology is that the carrier priorities established in the AN broadcast neighbor list should be consistent with the priority policy (or roaming policy) for carrier selection among home network and non-home network carriers, as provisioned in mobile terminals subscribed to the home network operator. Thus, in the figure, Operator A's roaming policy is set out in box 110 and its neighbor list priorities, shown in box 111 track that policy. Similarly, for mobile terminals subscribed to Operator B's network as their home network, Operator B's roaming policy is set out in box 113 and its neighbor list priorities, shown in box 112 track that policy. A somewhat expanded version of the home network roaming policy and the corresponding neighbor list priorities established according to the invention is shown for Operator A in FIG. 2 and for Operator B in FIG. 3. Note that higher numerical values in the "Priority" columns of the tables correspond to higher priority levels.

Figure 4:
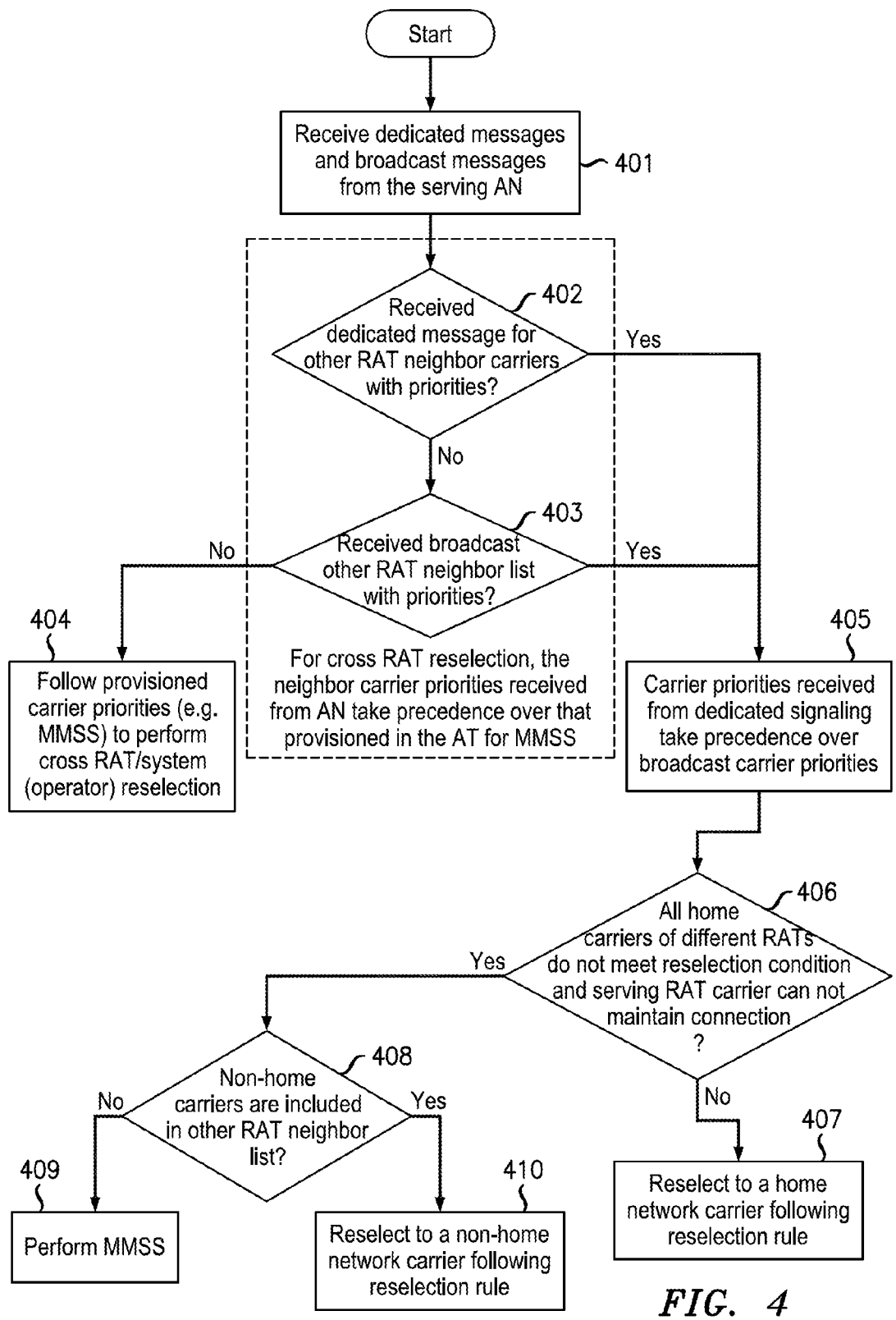
FIG. 4 provides a flow chart of the methodology of the invention.

A flow chart showing steps of the invention methodology is shown in FIG. 4. As shown in that figure the mobile terminal, characterized here as an Access Terminal (or AT) receives signals from the AN at step 401, which signals may include either dedicated reselection instruction or broadcast neighbor lists of prioritized carriers. As the preferred operation of the invention methodology gives precedence to dedicated messages directing particular cross-RAT reselection for a given AT over neighbor list carrier priorities broadcast to all ATs in the coverage area (shown at step 405), a first decision step 402 evaluates whether such a dedicated message was received. If yes, the method moves to step 406 described below. If no, the method moves to decision step 403 where a determination is made whether the received signal is a broadcast neighbor list with RAT carrier priorities. If yes, the method moves to step 406. If no, the method moves to step 404 and follows carrier priorities provisioned in the AT, as by MMSS. At decision step 406 the method makes a determination of whether any carriers of the home network in the priority listing are capable of providing an acceptable level of service for the AT. If one or more of such home network carriers are capable of providing such an acceptable level of service, the method moves to step 407 for reselection to one of such acceptable home network carriers. Only if none of the home-network neighbor list carriers are capable of providing an acceptable level of service, the method moves to step 408. At step 408, an evaluation is made as to whether the neighbor list includes non-home network carriers. If yes, the method moves to step 410 for reselection by the AT to one of the non-home network carriers. If no, the method moves to step 409 and follows carrier priorities provisioned in the AT, as by MMSS.

Herein, the inventors have disclosed a method for improved cross-RAT carrier reselection in a wireless network. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method in a wireless communication system comprising:
   determining, at an access terminal, prioritization of one or more carriers of one or more network operators providing service coverage in an area based on a preprogrammed priority list, one or more broadcast messages received from one or more of the network operators, and one or more dedicated messages received from one or more of the network operators;
   wherein determining prioritization of the one or more carriers comprises:
      setting, at the access terminal, an initial prioritization of the one or more carriers based at least in part on the preprogrammed priority list;
      adjusting, at the access terminal, the initial prioritization of carriers to create a current prioritization of carriers responsive to receiving a given one of the one or more broadcast messages;
      adjusting, at the access terminal, the current prioritization of carriers responsive to receiving a given one of the one or more dedicated messages.

2. The method of claim 1, wherein the broadcast message comprises a neighbor list broadcast by the given one of the one or more network operators.

3. The method of claim 2, wherein the neighbor list comprises a prioritization of carriers provided by the given one of the one or more network operators and carriers provided by one or more other network operators.

4. The method of claim 1, further comprising reverting, at the access terminal, the current prioritization of carriers to the initial prioritization of carriers when outside a coverage area of the one or more carriers listed in the broadcast message and the dedicated message.

5. The method of claim 1, wherein upon receipt of two or more broadcast messages from two or more network operators, utilizing a given one of the two or more broadcast messages to adjust the current prioritization of carriers when the given one of the two or more broadcast messages is received from a home network operator.

6. The method of claim 5, wherein when the two or more broadcast messages are not received from a home network operator, utilizing a most recently received one of the two or more broadcast messages to adjust the current prioritization of carriers.

7. The method of claim 1, wherein the preprogrammed priority list, broadcast message and dedicated message comprise respective prioritizations of carriers arranged at least in part based on a Radio Access Technology (RAT) of the one or more carriers.

8. The method of claim 7, wherein the RAT of the one or more carriers comprises one or more of a High Rate Packet Data (HRPD) transmission protocol and a Long Term Evolution (LTE) protocol.

9. The method of claim 1, wherein the broadcast message is sent to all access terminals in a coverage area.

10. The method of claim 1, wherein the dedicated message is sent to one or more particular access terminals in a coverage area.

11. An apparatus comprising:
an access terminal, the access terminal being configured for communication using one or more carriers of one or more network operators;
wherein the access terminal is configured to determine prioritization of the one or more carriers of the one or more network operators providing service coverage in an area based on a preprogrammed priority list, one or more broadcast messages received from one or more of the network operators, and one or more dedicated messages received from one or more of the network operators;
wherein the access terminal is configured to determine prioritization of the one or more carriers by:
setting an initial prioritization of the one or more carriers based on the preprogrammed priority list;
adjusting the initial prioritization of carriers to create a current prioritization of carriers responsive to receiving a given one of the one or more broadcast messages; and
adjusting the current prioritization of carriers responsive to receiving a given one of the one or more dedicated messages.

12. The apparatus of claim 11, wherein the broadcast message comprises a neighbor list broadcast by a given one of the one or more network operators.

13. The apparatus of claim 11, wherein the access terminal is configured to revert the current prioritization of carriers to the initial prioritization of carriers when the access terminal is outside a coverage area of the one or more carriers listed in the broadcast message and the dedicated message.

14. The apparatus of claim 11, wherein responsive to receipt of two or more broadcast messages from two or more network operators, the access terminal is configured to adjust the current prioritization of carriers based on a given one of the two or more broadcast messages when the given one of the two or more broadcast messages is received from a home network operator.

15. The apparatus of claim 11, wherein the preprogrammed priority list, broadcast message and dedicated message comprise respective prioritizations of carriers arranged at least in part based on Radio Access Technologies (RATs) of the one or more carriers.

16. The apparatus of claim 15, wherein the RAT of the one or more carriers comprises one or more of a High Rate Packet Data (HRPD) transmission protocol and a Long Term Evolution (LTE) protocol.

17. The apparatus of claim 11, wherein the one or more broadcast messages are sent to all access terminals in a coverage area.

18. The apparatus of claim 11, wherein a given one of the one or more dedicated messages is sent to one or more particular access terminals in a coverage area.

19. A wireless communication system comprising:
one or more network operators, each of the one or more network operators providing one or more carriers for communication in an area of the wireless communication system; and
one or more access terminals;
wherein a given one of the one or more access terminals is configured for communication using the one or more carriers of the one or more network operators;
wherein the given access terminal is configured to determine prioritization of the one or more carriers of the one or more network operators providing service coverage in an area based on a preprogrammed priority list, one or more broadcast messages received from one or more of the network operators, and one or more dedicated messages received from one or more of the network operators;
wherein the given access terminal is configured to determine prioritization of the one or more carriers by:
setting an initial prioritization of the one or more carriers based on the preprogrammed priority list;
adjusting the initial prioritization of carriers to create a current prioritization of carriers responsive to receiving a given one of the one or more broadcast messages; and
adjusting the current prioritization of carriers responsive to receiving a given one of the one or more dedicated messages.

20. The wireless communication system of claim 19, wherein the preprogrammed priority list, broadcast message and dedicated message comprise respective prioritizations of carriers arranged at least in part based on Radio Access Technologies (RATs) of the one or more carriers.

* * * * *